(12) United States Patent  
Hernandez et al.

(10) Patent No.: US 9,358,179 B2
(45) Date of Patent: Jun. 7, 2016

(54) MOBILE MASSAGE AND SPA UNITS

(71) Applicants: Mark S. Hernandez, Bayville, NJ (US); Silverio Hernandez, Philadelphia, PA (US)

(72) Inventors: Mark S. Hernandez, Bayville, NJ (US); Silverio Hernandez, Philadelphia, PA (US)

( * ) Notice: Subject to any disclaimer, the term of this patent is extended or adjusted under 35 U.S.C. 154(b) by 0 days.

(21) Appl. No.: 14/211,019

(22) Filed: Mar. 14, 2014

(65) Prior Publication Data

US 2014/0265242 A1 Sep. 18, 2014

Related U.S. Application Data

(60) Provisional application No. 61/787,869, filed on Mar. 15, 2013.

(51) Int. Cl.
| | |
|---|---|
| *A61H 37/00* | (2006.01) |
| *B60P 3/14* | (2006.01) |
| *B60P 3/32* | (2006.01) |

(52) U.S. Cl.
CPC . *A61H 37/00* (2013.01); *B60P 3/14* (2013.01); *B60P 3/32* (2013.01)

(58) Field of Classification Search
CPC ........... B62D 63/06; B60P 3/34; A61H 37/00
USPC ......................... 296/24.38, 190.02; 280/423.1
See application file for complete search history.

(56) References Cited

U.S. PATENT DOCUMENTS

| | | | | |
|---|---|---|---|---|
| 4,915,435 A * | 4/1990 | Levine | ....................... | 296/24.38 |
| 6,082,799 A * | 7/2000 | Marek | ....................... | 296/24.38 |
| 6,098,346 A * | 8/2000 | Miller et al. | ....................... | 52/67 |
| 6,293,612 B1 * | 9/2001 | Crean | ........................... | 296/175 |
| 6,497,442 B1 * | 12/2002 | Wacker | ....................... | 296/24.32 |
| 6,579,035 B1 * | 6/2003 | Watson | ............................ | 404/14 |
| 6,637,804 B1 * | 10/2003 | Crean | ........................... | 296/176 |
| 7,237,749 B2 * | 7/2007 | Ritts et al. | .................. | 244/118.5 |
| 7,469,949 B2 * | 12/2008 | Harder | ....................... | 296/26.13 |
| 7,530,616 B2 * | 5/2009 | Pomper | ...................... | 296/24.38 |
| 7,828,367 B2 * | 11/2010 | Hickam et al. | ................ | 296/156 |
| 8,082,698 B2 * | 12/2011 | Drake | ............................ | 52/79.5 |
| 8,443,759 B2 * | 5/2013 | Nagely | ........................ | 119/416 |
| 8,550,477 B2 * | 10/2013 | Bennett et al. | ............. | 280/47.35 |
| 8,550,528 B2 * | 10/2013 | Sidi | ............................. | 296/26.02 |
| 8,596,221 B2 * | 12/2013 | Gunn et al. | ................... | 119/408 |

(Continued)

OTHER PUBLICATIONS http://www.poshbeauty.com/2011/05/page/3/.*

(Continued)

*Primary Examiner* — Pinel Romain
(74) *Attorney, Agent, or Firm* — Carter, DeLuca, Farrell & Schmidt, LLP

(57) ABSTRACT

A mobile massage and spa unit includes a body, a lighting system and a massage table. The body includes a front, rear, and side walls and a divider extending between the side walls to divide the body into a front section and a rear section. A perimeter of the rear section is defined at least partially by a surface of the divider, a surface of the rear wall, and surfaces of the side walls. Such surfaces are coated with a reflective material. The lighting system includes one or more controllable RGB fixture mounted within the rear section and configured to emit a selected color light. The emitted light is reflected via the coated surfaces to illuminate the rear section with the selected color light. The massage table is disposed within the rear section and centered between the side walls thereof. A working area is defined completely around the massage table.

18 Claims, 3 Drawing Sheets

(56) References Cited

U.S. PATENT DOCUMENTS

| | | | |
|---|---|---|---|
| 8,720,379 B2* | 5/2014 | Moreno et al. | 119/454 |
| 2009/0134663 A1* | 5/2009 | Hickam et al. | 296/171 |
| 2010/0165463 A1* | 7/2010 | Mimura | 359/530 |
| 2010/0201146 A1* | 8/2010 | Alexander | 296/24.3 |
| 2010/0276964 A1* | 11/2010 | Nelson | 296/100.18 |
| 2011/0175391 A1* | 7/2011 | Nelson | 296/100.18 |
| 2011/0219651 A1* | 9/2011 | Borreggine et al. | 40/559 |
| 2012/0186167 A1* | 7/2012 | Naraghi | 52/80.2 |
| 2012/0206050 A1* | 8/2012 | Spero | 315/152 |
| 2012/0212970 A1* | 8/2012 | Johnson et al. | 362/510 |
| 2012/0265416 A1* | 10/2012 | Lu et al. | 701/70 |
| 2013/0027195 A1* | 1/2013 | Van Wiemeersch et al. | 340/431 |
| 2013/0038732 A1* | 2/2013 | Waite et al. | 348/148 |
| 2013/0054129 A1* | 2/2013 | Wong et al. | 701/408 |
| 2013/0154296 A1* | 6/2013 | Blackwell | A61G 3/001 296/24.38 |
| 2013/0293770 A1* | 11/2013 | Delzell | 348/370 |
| 2014/0168437 A1* | 6/2014 | Rother et al. | 348/148 |

OTHER PUBLICATIONS

Massage Therapy: Aboard The EcoTrailer(tm) by Registered Massage Therapists, <http://www.theecotrailer.com/film-on-set-massage.htm>, Retrieved on Jul. 1, 2014.

* cited by examiner

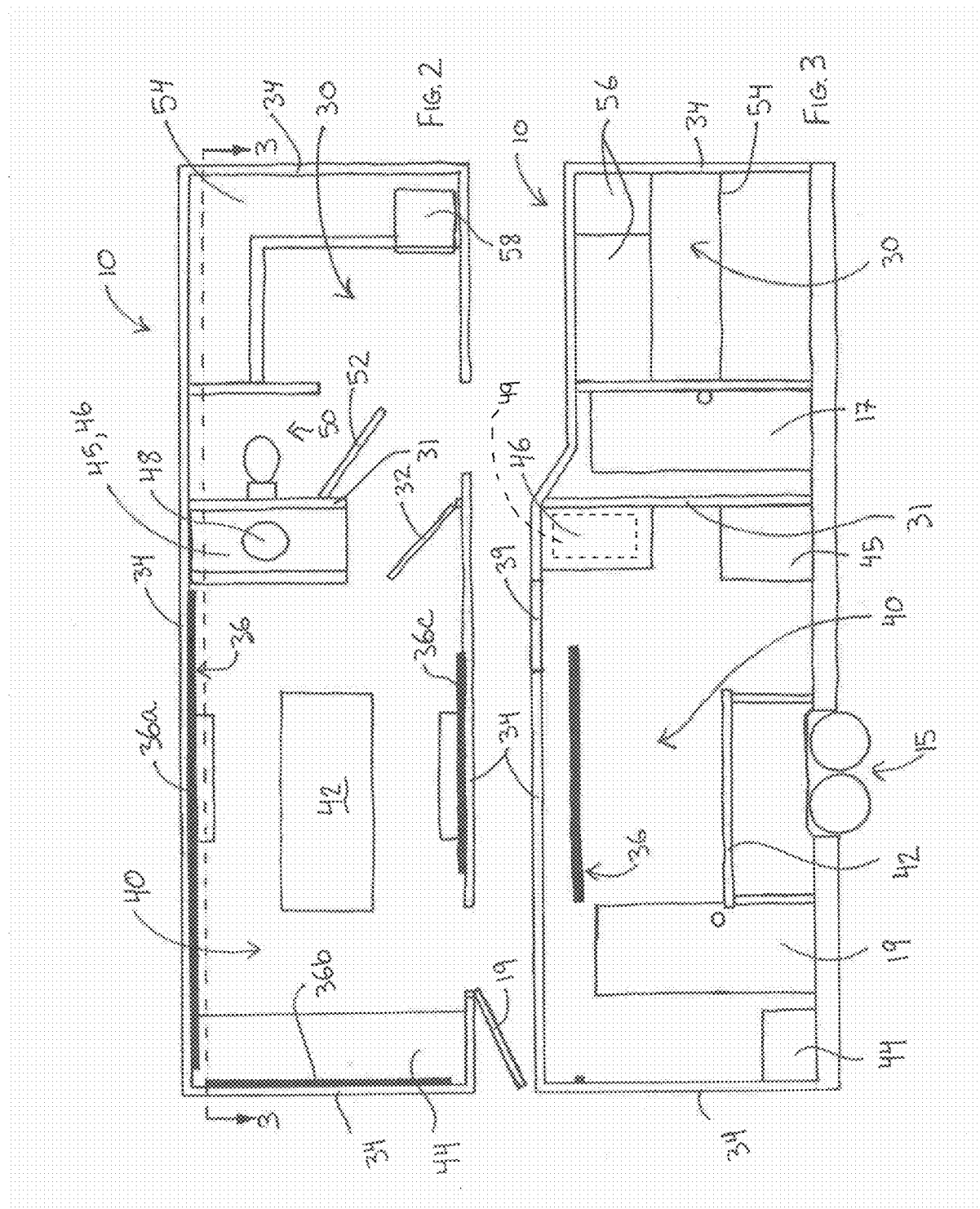

MOBILE MASSAGE AND SPA UNITS

CROSS-REFERENCE TO RELATED APPLICATIONS

This application claims the benefit of, and priority to, U.S. Provisional Patent Application No. 61/787,869, filed on Mar. 15, 2013, the entire contents of which are hereby incorporated herein by reference.

BACKGROUND

1. Technical Field

The present disclosure relates to massage and spa services and, more particularly, to mobile massage and spa units incorporated into vehicles, trailers, roll-off containers, and the like.

2. Background of Related Art

Spas and massage studios offer a wide variety of services including various different types of massages, facials, treatments, nail care services, relaxation therapies, etc. As can be appreciated, some services may require a particular setting or atmosphere to enable clients to obtain the full benefit of such services. Likewise, some services may require specific instrumentation, equipment, etc. to perform such services. In these situations, ready mobility becomes difficult due to the volume, size, weight, power considerations, etc. of the necessary equipment to perform such services and/or create a desired setting/atmosphere. It would therefore be beneficial to provide a fully integrated mobile massage and spa unit capable of offering a plurality of different services. In other words, it would be desirable to provide a mobile massage and spa unit that does not require compromise between mobility and functionality.

SUMMARY

The present disclosure relates to mobile massage/spa units incorporated into trailers, roll-off containers, or other suitable mobile or transportable structures. The mobile massage/spa units of the present disclosure may include various features, as will be detailed below, relating to the performance of massage/spa services, enhancement of the client's experience, convenience for employees, adaptability for mobile use, etc.

Provided in accordance with aspects of the present disclosure is a mobile massage and spa unit generally including a body, a lighting system and a massage table. The body has a front end and a rear end and defines a longitudinal axis extending between the front and rear ends. The body further includes a front wall, a rear wall, and first and second side walls extending between the front and rear walls. A divider extends between the first and second side walls to divide the body into a front section disposed towards the front end and a rear section disposed towards the rear end. A perimeter of the rear section is defined at least partially by a surface of the divider, a surface of the rear wall, and surfaces of the first and second side walls. These surfaces are at least partially coated with a reflective material. The lighting system including at least one RGB fixture mounted within the rear section. The at least one RGB fixture is controllable to emit a selected color light. The emitted light is reflected via the coated surfaces to illuminate the rear section with the selected color light, e.g., illuminating substantially all exposes surfaces within the rear section. The massage table is disposed within the rear section of the body and centered between the first and second side walls of the body. The massage table has a head end and a foot end and defines a longitudinal axis extending between the head and foot ends. The longitudinal axis of the massage table extends in parallel orientation relative to the longitudinal axis of the body. A working area is defined around the massage table, e.g., having a first portion defined between the head end of the massage table and the divider of the body, a second portion defined between a first side of the massage table and the first side wall of the body, a third section defined between the second side of the massage table and the second side wall of the body, and a fourth section defined between the foot end of the massage table and the rear wall of the body.

In aspects, the body is a trailer body. In such aspects, an attachment member extending from the front end of the trailer body may be provided. The attachment member is configured to releasably secure the trailer body to a transport vehicle. A least one axle and wheel assembly is also provided in such aspects. The at least one axle and wheel assembly is disposed towards the rear end of trailer body. Further, the trailer body may include a stand assembly for supporting the trailer body when not secured to a transport vehicle, which may be configured to automatically level the trailer body.

In other aspects, the body is a roll-off container body.

In aspects, the massage table is hydraulically-actuated. Additionally or alternatively, the massage table may be configured to be selectively articulated and/or selectively heated.

In aspects, the front section includes a desk disposed therein. The front section may include other components for functioning as an office for employees or other personnel.

In aspects, first and second exterior doors are provided. The first exterior door provides access to the front section and the second exterior door provides access to the rear section. An interior door disposed between the front and rear sections may also be provided.

In aspects, the body includes an exteriorly accessible compartment and an on-board generator and control system housed within the exteriorly accessible compartment.

In aspects, a bench is disposed within the rear section and positioned to extend along the rear wall of the body. The bench may include one or more surfaces that are coated with the reflective material.

In aspects, at least one cabinet is disposed within the rear section and positioned to extend along the divider. The at least one cabinet may include one or more surfaces that are coated with the reflective material.

In aspects, a sink is disposed within the rear section and positioned to extend along the divider.

In aspects, a microwave is disposed within the rear section and mounted on the divider.

In aspects, a retractable awning is mounted on an exterior surface of the body.

In aspects, a bathroom is disposed between the front and rear sections, or in the front section.

Additional aspects and features not specifically detailed above are provided below.

BRIEF DESCRIPTION OF THE DRAWINGS

Various aspects of the present disclosure are described hereinbelow with reference to the drawings, wherein:

FIG. 2 is a top, schematic view of one particular configuration of the trailer of FIG. 1;

FIG. 3 is a side, schematic view of the configuration of FIG. 2; and

DETAILED DESCRIPTION

Figure 1:
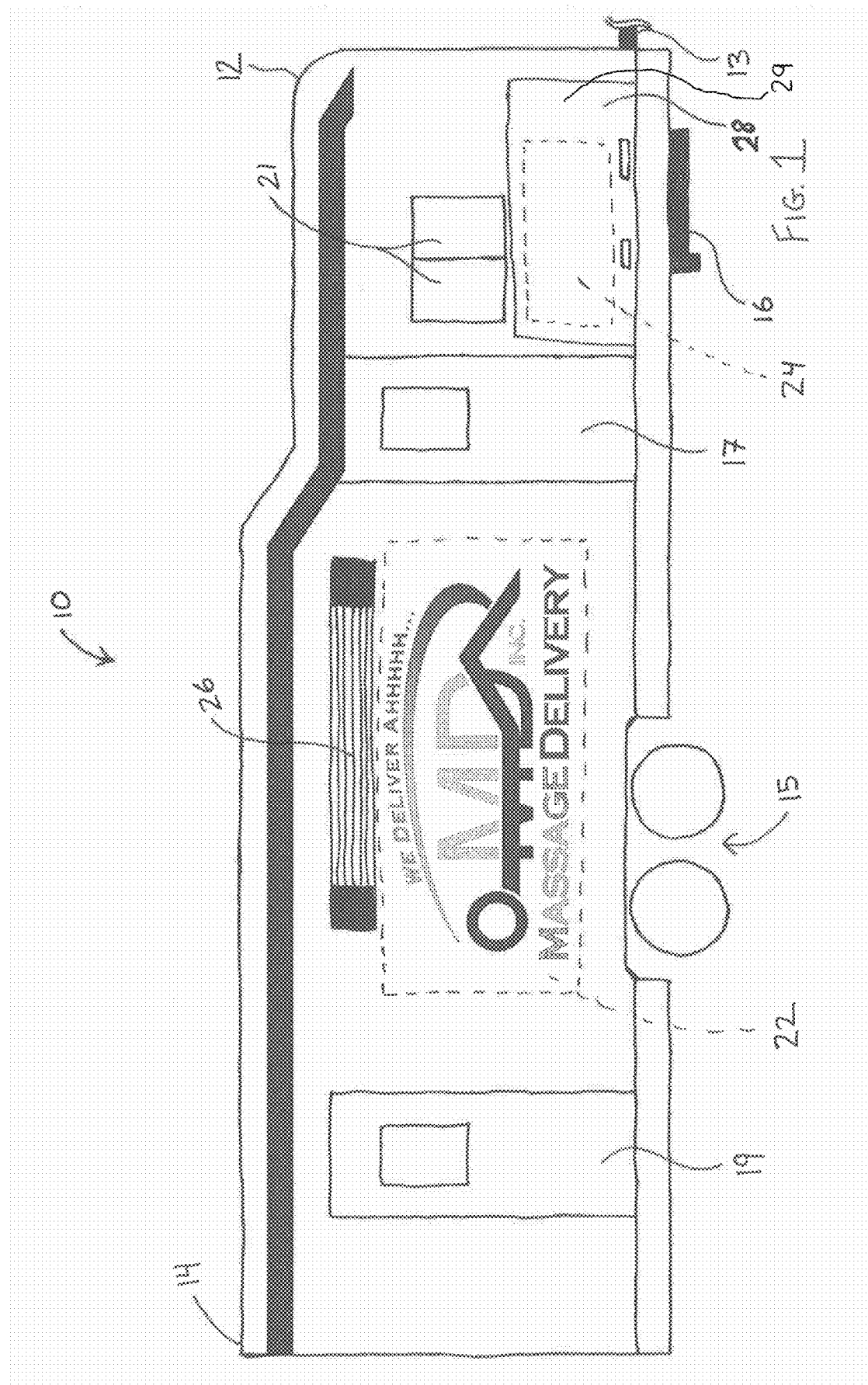
FIG. 1 is a side view of a trailer provided in accordance with the present disclosure.

Turning now to FIG. 1, a mobile massage/spa unit is shown incorporated into a trailer 10. Trailer 10 includes a body having a front end 12 including an attachment member 13 configured to releasably engage trailer 10 to a suitable vehicle (not shown) for transport, e.g., towing, and a rear end 14. A set of wheel and axle assemblies 15 support trailer 10 towards the rear end 14 thereof and allow trailer 10 to be towed by a suitable vehicle (not shown) engaged to front end 12 of trailer 10 via attachment member 13. The axles of wheel and axle assemblies 15 may be torsions axles, e.g., Torflex® axles sold by Dexter Axle Company of Elkhart, Ind., USA, or other suitable axles capable of sufficiently supporting trailer 10. Trailer 10 may further include one or more front stand assemblies 16 that are movable between a storage position (as shown) and an extended position, wherein the front stand assembly(s) 16 supports trailer 10 in the absence of a towing vehicle attached thereto. In particular, front stand assembly(s) 16 may be a powered tongue jack. Further, the front stand assembly(s) 16 may incorporate automatic leveling functionality such that trailer 10 is automatically leveled upon extension of front stand assembly(s) 16. Additional supports (not shown) may also be provided to facilitate the supporting and/or leveling of trailer 10 and/or the position of front stand assembly(s) 16 may be modified depending on a particular purpose.

Continuing with reference to FIG. 1, trailer 10 includes a first door 17 positioned towards front end 12 thereof and a second door 19 positioned towards rear end 14 thereof. One or more windows 21 are positioned towards front end 12 of trailer 10, although other windows may be additionally or alternatively provided. The exterior of trailer 10 further includes a plurality of areas 22, 24 configured for information, logos, etc. For example, the company logo may be displayed in area 22, while contact information, hours of operation, or other information may be displayed in area 24. Other configurations are also contemplated. Above area 22, or in any other suitable location, a retractable awning 26 is provided. Retractable awning 26 provides shade and weather protection during outdoor massage services and provides a convenient location for employees to disseminate information, generate clients, etc. Outdoor lighting systems and/or outdoor sound systems are also contemplated for these and other purposes. As can be appreciated, doors 17, 19; display areas 22, 24; and retractable awning 26 are positioned on the curb-side of trailer 10 (with respect to the right-hand driving convention, as followed in the U.S.), for ease of use and safety purposes.

Trailer 10 may additionally include one or more compartments 28 accessible from an exterior of trailer 10 for facilitating access to the input, generator, and control system 29 of trailer 10. System 29 powers and controls the various components of trailer 10, which will be detailed below. Providing access to a centralized system 29 via compartment 28 facilitates hook-up to an external power source, e.g., a remote generator, and external inputs, and well as for servicing/configuring any or all of the components of system 29. Providing system 29 accessible via compartment 28 also facilitates the control, e.g., plumbing control, HVAC control, and/or control of individual electronic components/systems, of the various components of trailer 10 at a centralized location, although individual control modules may also be provided within or on trailer 10 where appropriate.

Turning now to FIGS. 2 and 3, the interior of trailer 10 includes various features configured to facilitate and enhance an employee's ability to provide massage/spa services and the client's experience during receipt of such services. As can be appreciated, unique challenges and significant constraints in providing such features are imposed by the fact that trailer 10 is a self-sufficient, fully comprehensive mobile platform, as compared to the fixed building structures (with all applicable utilities) utilized by typical massage/spa services.

The interior of trailer 10 includes a forward section 30 and a rear section 40. An internal door 32 separates the forward and rear sections 30, 40, respectively, from one another. The walls 34 of trailer 10, are sufficiently insulated, e.g., via 2" foam insulated walls, to inhibit outside noises from disturbing a patient undergoing massage/spa services and for regulating temperature. Ceiling and floor insulation may also be provided for similar purposes. Likewise, dividing wall 31 and internal door 32 between forward and rear sections 30, 40, respectively, may be insulated. Further, the floor of rear section 40 may be covered with rubber flooring, e.g., black coin rubber flooring, to facilitate clean up after services are performed. Front section 30, on the other hand, may be carpeted as is typical in an office-like setting, although portions of rear section 40 may likewise include carpeting.

The interior surfaces of walls 34 at least in rear section 40 are painted or otherwise coated with a smooth material that may be white in color. More specifically, the interior surfaces of walls 34 may be coated with a reflective white glossy surface capable of displaying a desired color upon illumination via lighting system 36. The ceiling of rear section 40 may likewise include such a coating. The ceiling of rear section 40 may further include a skylight 39 with a retractable black-out shade (not explicitly shown) for controlling the amount of natural light entering rear section 40. Lighting system 36 includes a plurality of RGB (Red, Green, Blue) fixture segments 36a, 36b, 36c mounted on the walls 34 of rear section 40, e.g., either or both of the side walls and/or the rear wall. As such, by setting lighting system 36 to a desired configuration, rear section 40 and, in particular walls 34, may exhibit a desired color, pattern, etc. The RGB fixture segments 36a, 36b, 36c allow for display of any color within the RGB array, as known in the art of color lighting.

Rear section 40 further includes a full-size massage table 42 generally positioned in a center of rear section 40 (centered between the side walls thereof) above the wheel and axle assemblies 15 (FIG. 1). Massage table 42 may be hydraulically powered, e.g., for raising/lowering and/or articulation, and may also include heating capability. Massage table 42 is oriented such that its longitudinal axis extends parallel to the longitudinal axis of trailer 10. Such a configuration best-utilizes the limited space provided within rear section 40 of trailer 10 and provides sufficient working room for a masseuse or other employee to work on a client from any position alongside massage table 42, at the head end of massage table 42, or at the foot end of massage table 42. Further, no compartments or other structures having significant depth are provided on the side walls of rear section 40 in the vicinity of table 42 so as to maximize the area surrounding table 42 and, in particular, the width dimension thereof. Thus, an unimpeded working area for the masseuses or other employees is provided. Centering the massage table 42 within rear section 40 also enhances a client's experience as any lighting, aromatherapy, temperature, and/or other effects fully surround the client, allowing such to be sensed 360 degrees around the massage table 42. Likewise, with the side walls of rear section 40 substantially exposed, e.g., not having components attached thereto or otherwise obscuring the surfaces thereof, the desired color, pattern, etc. effect displayed on the side walls by the lighting system 36 can be fully appreciated.

A bench 44 extends across the back wall of rear section 40. Bench 44 may be configured as a trunk, thus providing under-seat storage for equipment, tools, etc. By positioning bench 44 along the back wall of rear section 40, rearward of door 19, bench 44 does not interfere with the working area surrounding table 42, while still providing the functionality of storage, a place for a client to change, etc. Further, the front, exposed surface of bench 44 may include a reflective white glossy finish for the purposes detailed above.

Towards a front side of rear section 40, e.g., adjacent dividing wall 31 and internal door 32, additional storage cabinets 45, 46 are provided, in addition to a sink 48 that allows employees to wash their hands, wash equipment, etc. A microwave shelf may be built-into upper cabinet 46 for conveniently mounting a microwave 49 above sink 48 (or in any other suitable location). Specifically, microwave 49 may be configured for heating tools and/or instruments for use in, for example, Mu-Xing therapy or other services/treatments requiring heated implements. Similar to bench 44, by positioning cabinets 45, 46, sink 48, and the microwave 49 along dividing wall 32, the working area surrounding table 42, particularly along the sides thereof, is maximized, without losing the functionality of storage sink access, and microwaving capability. The exposed surfaces of cabinets 45, 46, as well as any other exposed surface of dividing wall 31 and the rearward face of door 32 may include a reflective white glossy finish for the purposes detailed above. As such, with substantially all exposed surfaces about the perimeter of rear section 40 including the reflective white glossy finish, a desired color, pattern, etc. effect displayed by the lighting system 36 can be fully appreciated.

With continued reference to FIGS. 2 and 3, front section 30 of trailer 10 serves as an office area for employees and, as mentioned above, is separated from rear section via dividing wall 31 and internal door 32 (either or both of which may be insulated). First door 17 provides access to front section 30, while rear door 19 provides access to rear section 40, thus enabling separate entry for employees as compared to clients. Front section 30 of trailer 10 includes a bathroom 50 area having its own door 52, a desk 54, e.g., an "L-shaped" desk, and over-head cabinetry 56 for storage of files and other office-related items. A refrigerator 58 may be tucked under desk 54.

Trailer 10 may include an integrated control system for controlling the various system of trailer 10, e.g., heating and air-conditioning, lighting, aromatherapy, etc. The control system may be programmable using one or more preset configurations, e.g., a preset for the each of the particular services offered, and/or may be manually controlled. Further, separate zones may be provided for front and rear sections 30, 40, respectively, such that the temperature, lighting, etc. may differ therebetween.

Figure 4:
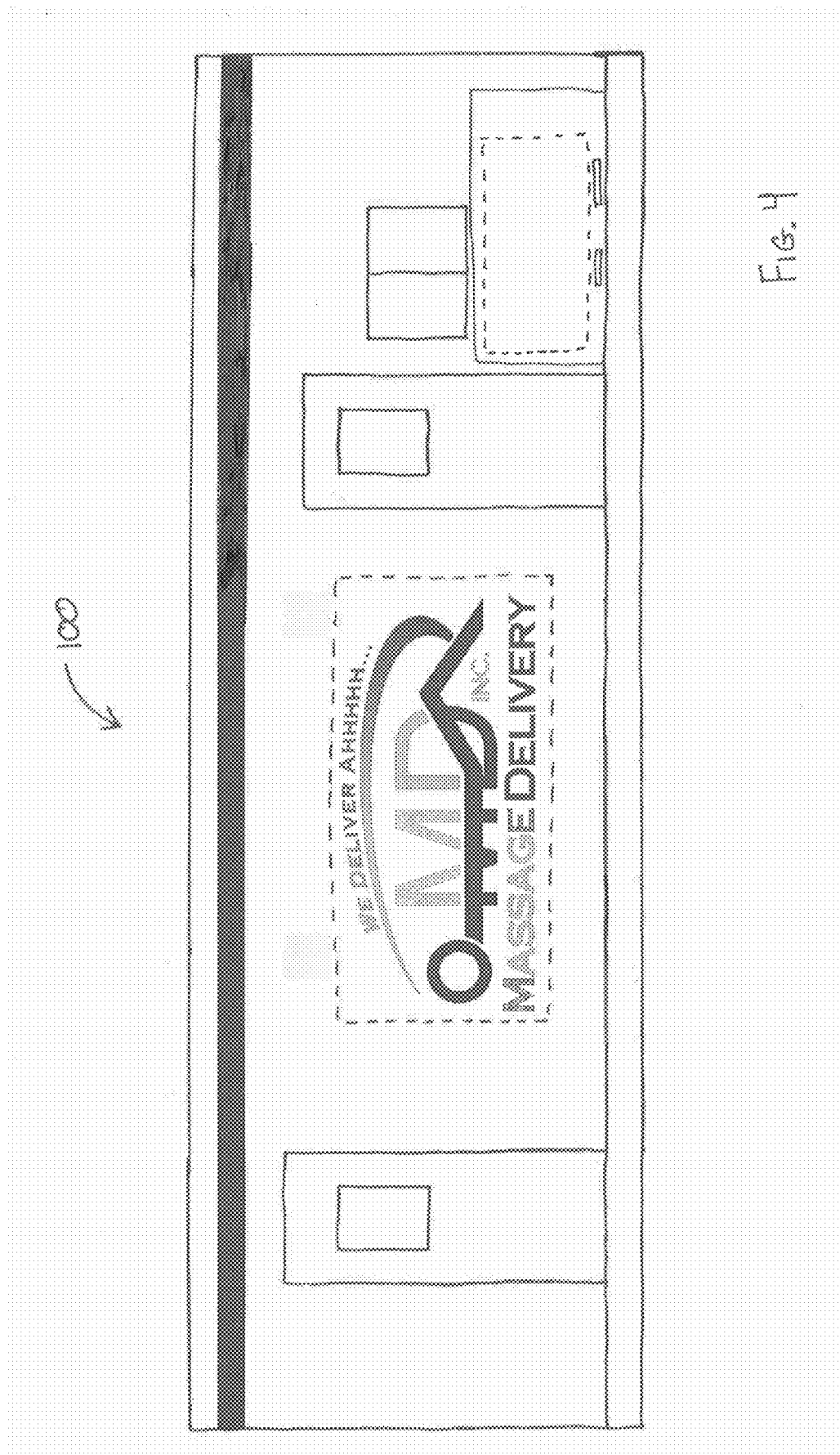
FIG. 4 is a side view of a roll-off container provided in accordance with the present disclosure.

Turning now to FIG. 4, as an alternative to a trailer, the mobile massage/spa units provided in accordance with the present disclosure may be incorporated into a roll-off container 100. Roll-off container 100 may be delivered via a flatbed truck (not shown) to locations where massage/spa services may be particularly desirable, for semi-permanent use. Roll-off container 100 may include any or all of the features of trailer 10, described above.

While several embodiments of the disclosure have been shown in the drawings and described hereinabove, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A mobile massage and spa unit, comprising:
    a body having a front end and a rear end and defining a longitudinal axis extending between the front and rear ends, the body including a front wall, a rear wall, and first and second side walls extending between the front and rear walls, the body having a divider extending between the first and second side walls to divide the body into a front section disposed towards the front end and a rear section disposed towards the rear end, a perimeter of the rear section defined at least partially by a surface of the divider, a surface of the rear wall, and surfaces of the first and second side walls, the surfaces of the divider, rear wall, and first and second sides coated with a reflective material;
    a lighting system including at least one RGB fixture mounted within the rear section, the at least one RGB fixture controllable to emit a selected color light, wherein the emitted light is reflected via the coated surfaces of the divider, rear wall, and first and second sides to illuminate the rear section with the selected color light; and
    a massage table disposed within the rear section of the body and centered between the first and second side walls of the body, the massage table having a head end and a foot end and defining a longitudinal axis extending between the head and foot ends, the longitudinal axis of the massage table extending in parallel orientation relative to the longitudinal axis of the body, wherein a working area is defined around the massage table, the working area including a first portion defined between the head end of the massage table and the divider of the body, a second portion defined between a first side of the massage table and the first side wall of the body, a third section defined between the second side of the massage table and the second side wall of the body, and a fourth section defined between the foot end of the massage table and the rear wall of the body.

2. The mobile massage and spa unit according to claim 1, wherein the body is a trailer body, and wherein the unit further includes:
    an attachment member extending from the front end of the trailer body; and
    at least one axle and wheel assembly supporting the trailer body, the at least one axle and wheel assembly disposed towards the rear end of trailer body.

3. The mobile massage and spa unit according to claim 1, wherein the body is a container body.

4. The mobile massage and spa unit according to claim 1, wherein the massage table is hydraulically-actuated.

5. The mobile massage and spa unit according to claim 1, wherein the massage table is capable of being selectively articulated.

6. The mobile massage and spa unit according to claim 1, wherein the massage table is capable of being selectively heated.

7. The mobile massage and spa unit according to claim 1, wherein the front section includes a desk disposed therein.

8. The mobile massage and spa unit according to claim 1, further including first and second exterior doors, the first exterior door providing access to the front section and the second exterior door providing access to the rear section.

9. The mobile massage and spa unit according to claim 1, further including an interior door disposed between the front and rear sections.

10. The mobile massage and spa unit according to claim 1, wherein the body includes an exteriorly accessible compartment and an on-board generator and control system housed within the exteriorly accessible compartment.

11. The mobile massage and spa unit according to claim 1, further including a bench disposed within the rear section, the bench positioned to extend along the rear wall of the body.

12. The mobile massage and spa unit according to claim 11, wherein a surface of the bench is coated with the reflective material.

13. The mobile massage and spa unit according to claim 1, further including at least one cabinet disposed within the rear section, the at least one cabinet positioned to extend along the divider.

14. The mobile massage and spa unit according to claim 13, wherein a surface of the at least one cabinet is coated with the reflective material.

15. The mobile massage and spa unit according to claim 1, further including a sink disposed within the rear section, the sink positioned to extend along the divider.

16. The mobile massage and spa unit according to claim 1, further including a microwave disposed within the rear section, the microwave mounted on the divider.

17. The mobile massage and spa unit according to claim 1, further including a retractable awning mounted on an exterior surface of the body.

18. The mobile massage and spa unit according to claim 1, further including a bathroom disposed between the front and rear sections or disposed within the front section.

\* \* \* \* \*